United States Patent Office 2,744,834
Patented May 8, 1956

2,744,834

WAX COMPOSITION INHIBITED FROM OXIDATIVE DETERIORATION

Harry R. Robinson, Port Arthur, Tex., assignor to The Texas Company, New York, N. Y., a corporation of Delaware No Drawing. Application October 10, 1952,
Serial No. 314,199

4 Claims. (Cl. 106—270)

This invention relates to wax containing a very small concentration of a multicomponent antioxidant.

The antioxidant of this invention comprises a mixture of oil-soluble chlorophyll, carotinoids, waxes, phospholipides and vegetable oil, and is obtained by hydrocarbon extraction of dehydrated chlorophyll-containing plant matter. The hydrocarbon solvent employed for extracting the dehydrated chlorophyll-containing plant matter is normally used in conjunction with a polar solvent such as low boiling alcohols and ketones. An exceptional thermally stable wax composition results from the incorporation of 0.1 to 3 parts per million of this antioxidant therein. A paraffin wax containing 0.1 to 3 parts per million of an antioxidant obtained by extraction of dehydrated chlorophyll-containing plant matter with a hydrocarbon-polar solvent mixture displays exceptional thermal stability, that is, it can be maintained at elevated temperature for a considerable period without the development of a sour or burned odor.

The exact composition of the antioxidant of this invention is unknown, but it comprises approximately 15 to 25 per cent oil-soluble chlorophyll, 25 to 35 per cent vegetable oil, 10 to 25 per cent ester-type wax, 5 to 15 per cent phospholipides and 5 to 10 per cent carotinoids. This mixture can be obtained by extraction of a large variety of green plants, but an exceptionally active antioxidant composition results from subjecting dehydrated alfalfa hay to extraction with a naphtha-oxygenated hydrocarbon mixture.

The extraction, which is normally effected at temperatures between atmospheric and 200° F., is usually effected with a hydrocarbon solvent which has been modified with a polar oxygenated hydrocarbon. Particularly preferred polar solvents are low boiling alcohols and ketones containing up to 6 carbon atoms; acetone, methylethyl ketone, methylbutyl ketone, ethyl alcohol and isopropyl alcohol are the most used polar solvents. The preferred extraction medium comprises 10 to 60 per cent polar oxygenated hydrocarbon and 40 to 90 per cent hydrocarbon. Naphtha is usually employed as the hydrocarbon component of the extraction medium.

The extraction procedure by which the antioxidant is obtained is usually the first step in the manufacture of the so-called water-soluble chlorophyll which is currently enjoying popularity as a medical bactericide and as a deodorant in a score of miscellaneous products including chewing gum, mouth washes, dog foods, shampoos, soaps, cigarettes, etc. The multi-component antioxidant is recovered from the hydrocarbon-polar solvent extract phase in the form of an oily liquid by evaporation of the solvent which is preferably effected under reduced pressure.

The oil mixture obtained on evaporation of the extraction solvent is advantageously dissolved in a hydrocarbon solvent for use in paraffin wax. A heptane solution containing 1 to 3 per cent of the multi-component antioxidant has proven to be an excellent means of incorporating the antioxidant in wax compositions.

The mechanism by which the antioxidant of this invention inhibits oxidation and imparts thermal stability to food compositions and paraffin waxes is not completely understood. It has been speculated that the chlorophyll component of the composition is the active ingredient. This theory is based primarily on the current popularity of water-soluble chlorophyll as a bactericide and odor masker in all sorts of products. The carotinoids and phospholipides may exert a substantial synergistic action on the activity of the oil-soluble chlorophyll and account for its exceptional activity even at concentrations in the range of 0.1 part per million of the material in which it is incorporated.

It is important to note that the oil-soluble chlorophyll component of this antioxidant mixture is chemically distinct from water-soluble chlorophyll, which term describes a class of compounds more properly termed metal chlorophyllins, and is actually the material from which the metal chlorophyllins are manufactured. This invention is independent of the mechanism whereby the antioxidant exercises its activity and is solely concerned with the exceptional antioxidant activity displayed by the multi-component fraction obtained by extraction of chlorophyll-containing plants with a mixture of a hydrocarbon and a polar oxygenated hydrocarbon solvent.

A particularly advantageous feature of the antioxidant is that it is effective in such small concentrations that the resulting inhibited thermally stable wax does not possess the characteristic green chlorophyll color. This result of the high potency of the antioxidant is a major advance because the characteristic chlorophyll green is objectionable in many products. This is particularly true of paraffin wax which is widely used in the manufacture of moisture-proof containers such as milk cartons, bread wrappers, etc.

Colorless wax compositions which are free from the characteristic alfalfa hay odor normally associated with chlorophyll-containing products are formed by the addition of less than 3 parts per million of the antioxidant of this invention to paraffin wax. The superior wax compositions of this invention contain 0.1 to 3 parts per million of the multi-component antioxidant obtained by extraction of chlorophyll-containing plants with a hydrocarbon. It is necessary to restrict the upper concentration of antioxidant to 3 parts per million in order to prevent the inhibited wax from possessing a green tint and an odor of alfalfa hay; a wax sample containing 5 parts per million of antioxidant has a slight green color and the odor of alfalfa hay. The lower concentration limit of 0.1 part per million must be observed in order for the resulting inhibited wax to display antioxidant properties and thermal stability. Optimum results are obtained by incorporating 0.2 to 1 part per million of the antioxidant in the wax composition.

The stability of the paraffin wax composition containing the multi-component antioxidant of this invention was demonstrated in a heat stability test at 200° and 250° F. temperature levels. This heat stability test, which type is standard in the paraffin wax industry, is effected as follows: ⅔ pint of inhibited wax is introduced into a wide mouth pint bottle which is then covered with a watch glass and placed in a forced-draft oven maintained at a constant temperature level; the bottle is removed from the oven at intervals and the odor of the wax noted after lifting the watch glass; the bottle, with watch glass replaced, is returned to the oven; the heat stability of the wax is the time required for the wax to develop a very slight sour or burned odor.

The samples are prepared for the heat stability test by addition of antioxidant in the required amount to the wax in the form of a 2 per cent heptane solution.

The antioxidant is blended into the molten wax with stirring at a temperature between 140 and 160° F.

A paraffin wax containing 0.67 part per million of the antioxidant of this invention displayed no trace of oxidized odor even after 26 days in the 200° F. heat stability test; uninhibited wax developed a sour odor in less than 4 days. The antioxidant-containing wax sample exhibited no trace of organic peroxides after this period, indicating that oxidation had not taken place. The same inhibited wax sample, after transfer to a hotter oven, did not develop an oxidized odor until after 48 hours under the conditions of the 250° F. heat stability test.

By way of comparison, it was necessary to use 8 parts per million (that is about 16 times as much) of a commercially available antioxidant comprising butyl hydroxyanisole, propyl gallate and citric acid in order to obtain a wax possessing similar antioxidant properties and heat stability. The remarkable effectiveness of the multi-component antioxidant of this invention is demonstrated by the fact that it is necessary to use approximately 16 times as much of a commercially available antioxidant in order even to approximate the results obtained with the antioxidant of this invention.

The true antioxidant nature of the multi-component composition of this invention is proven by the fact that its addition to a paraffin wax in which a sour odor had been developed by heating to 250° F. did not mask or destroy the sour odor of the wax. This fact clearly proves that the antioxidant of this invention acts by preventing the formation of sour smelling products by oxidation rather than by absorbing or masking the odors as they develop.

The term, paraffin wax, as used in this application includes the hard macrocrystalline waxes, the microcrystalline petrolatum-type waxes and mixtures thereof. The novel antioxidant is particularly useful in imparting thermal stability to the hard macrocrystalline waxes and to mixtures of macro- and microcrystalline waxes. A small amount of microcrystalline wax is often added to hard wax to improve its coating characteristics.

The antioxidant can also be employed to inhibit and impart thermal stability to plant-derived ester-type waxes such as carnauba wax and sugar cane wax which are also subject to oxidative deterioration at elevated temperatures.

Obviously, many modifications and variations of the invention as hereinbefore set forth may be made without departing from the spirit and scope thereof and, therefore, only such limitations should be imposed as are indicated in the appended claims.

I claim:
1. A colorless wax normally subject to oxidative deterioration containing between 0.1 and 3 parts per million of an antioxidant obtained by extraction of chlorophyll-containing plant matter with a solvent mixture of hydrocarbon and polar oxygenated hydrocarbon.
2. A wax of the type described in claim 1 in which the antioxidant comprises oil-soluble chlorophyll, carotinoids, ester-type plant wax, phospholipides and vegetable oil.
3. A wax of the type described in claim 1 which contains 0.2 to 1 part per million of antioxidant.
4. A wax of the type described in claim 1 in which the antioxidant is obtained by extraction of dehydrated alfalfa with a mixture of naphtha and a polar solvent selected from the group consisting of low boiling alcohols and ketones containing less than 6 carbon atoms.

References Cited in the file of this patent

UNITED STATES PATENTS

| | | |
|---|---|---|
| 1,880,813 | Coe | Oct. 4, 1932 |
| 2,198,202 | Musher | Apr. 23, 1940 |
| 2,233,143 | Musher | Feb. 25, 1941 |
| 2,275,661 | Steinle et al. | Mar. 10, 1942 |
| 2,428,740 | Mann | Oct. 7, 1947 |
| 2,446,116 | Wall | July 27, 1948 |

FOREIGN PATENTS

| | | |
|---|---|---|
| 564,282 | Great Britain | Sept. 21, 1944 |

OTHER REFERENCES

"The Drug and Cosmetic Industry" of July 1940, page 112.